US009676597B2

(12) United States Patent
Senger et al.

(10) Patent No.: US 9,676,597 B2
(45) Date of Patent: Jun. 13, 2017

(54) TRUSS CONSTRUCTION FOR A PASSENGER CONVEYOR

(75) Inventors: Alois Senger, Gresten (AT); Goetz Metzdorf, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 899 days.

(21) Appl. No.: 13/496,232

(22) PCT Filed: Oct. 19, 2009

(86) PCT No.: PCT/IB2009/007162

§ 371 (c)(1),
(2), (4) Date: Mar. 15, 2012

(87) PCT Pub. No.: WO2011/048437

PCT Pub. Date: Apr. 28, 2011

(65) Prior Publication Data

US 2012/0168277 A1 Jul. 5, 2012

(51) Int. Cl.

| | |
|---|---|
| ***B66B 21/02*** | (2006.01) |
| ***B23P 6/00*** | (2006.01) |
| ***B66B 23/00*** | (2006.01) |
| ***B66B 23/14*** | (2006.01) |
| *B66B 19/00* | (2006.01) |

(52) U.S. Cl.
CPC .............. *B66B 23/00* (2013.01); *B66B 23/14* (2013.01); *B66B 19/007* (2013.01); *Y10T 29/4973* (2015.01)

(58) Field of Classification Search
USPC ...................... 198/321, 325, 326, 337, 860.1
See application file for complete search history.

(56) References Cited

U.S. PATENT DOCUMENTS

| | | | | | |
|---|---|---|---|---|---|
| 2,936,872 | A | * | 5/1960 | Kneipp | 198/326 |
| 4,175,653 | A | * | 11/1979 | Kubota et al. | 198/332 |
| 4,295,556 | A | * | 10/1981 | Saito et al. | 198/325 |
| 4,488,631 | A | * | 12/1984 | Courson | 198/335 |
| 4,535,880 | A | * | 8/1985 | Boltrek | 198/330 |
| D283,445 | S | * | 4/1986 | Allard | D25/119 |
| 4,811,829 | A | * | 3/1989 | Nakazawa et al. | 198/326 |
| 4,832,169 | A | * | 5/1989 | Goto | 198/326 |

(Continued)

FOREIGN PATENT DOCUMENTS

| | | |
|---|---|---|
| CN | 85105326 A | 1/1987 |
| EP | 1321424 A1 | 6/2003 |

(Continued)

OTHER PUBLICATIONS

International Search Report and Written Opinion of the International Searching Authority for International application No. PCT/IB2009/007162 mailed Jul. 20, 2010.

(Continued)

*Primary Examiner* — Douglas Hess
(74) *Attorney, Agent, or Firm* — Carlson, Gaskey & Olds

(57) ABSTRACT

The invention relates to a truss construction (2) for a passenger conveyor comprising at least one self-supporting element (4, 16). The self-supporting element, which is a roller molded element (4, 16), extends in a conveying direction of the passenger conveyor and is formed with at least one rail portion (6, 8) for guiding step chain rollers (7*a*) and/or step rollers (7*b*).

23 Claims, 3 Drawing Sheets

(56) References Cited

U.S. PATENT DOCUMENTS

| | | | | | |
|---|---|---|---|---|---|
| 5,598,784 | A * | 2/1997 | Kubsik et al. | 104/111 |
| 5,601,179 | A | 2/1997 | Wente et al. | |
| 5,782,333 | A * | 7/1998 | Pitts | 198/336 |
| 6,247,574 | B1 * | 6/2001 | Yamaguchi et al. | 198/326 |
| 6,374,981 | B1 * | 4/2002 | Gschwendtner et al. | 198/321 |
| 6,471,034 | B2 * | 10/2002 | Lunardi et al. | 198/333 |
| 6,685,002 | B1 * | 2/2004 | Martel et al. | 198/321 |
| 6,814,215 | B2 * | 11/2004 | Krampl | 198/321 |
| 6,918,708 | B2 * | 7/2005 | Noda et al. | 400/641 |
| 7,207,427 | B2 * | 4/2007 | Kuhnert et al. | 198/335 |
| 7,537,102 | B2 * | 5/2009 | Matheisl et al. | 198/334 |
| 7,785,686 | B2 * | 8/2010 | Fukui et al. | 428/57 |
| 8,393,462 | B2 * | 3/2013 | Evans | 198/831 |
| 2002/0175039 | A1 | 11/2002 | Fargo et al. | |
| 2003/0116402 | A1 | 6/2003 | Krampl | |
| 2007/0029161 | A1 | 2/2007 | Streibig et al. | |
| 2016/0376128 | A1 * | 12/2016 | Gonzalez Pantiga et al. | |

FOREIGN PATENT DOCUMENTS

| | | | |
|---|---|---|---|
| GB | 2121748 | A | 1/1984 |
| JP | 61216831 | A | 9/1986 |
| JP | 01308388 | A | 12/1989 |
| JP | 02107858 | A | 4/1990 |
| JP | 3-46986 | | 2/1991 |
| JP | 2004074191 | A | 3/2004 |

OTHER PUBLICATIONS

State Intellectual Property Office of People's Republic China First Search for Application No. 200980162106.9 dated Jan. 17, 2017.

* cited by examiner

TRUSS CONSTRUCTION FOR A PASSENGER CONVEYOR

BACKGROUND

The present invention relates to a truss construction for a passenger conveyor.

Passenger conveyors are e.g. escalators or moving walkways. Escalators are passenger conveyors that typically carry passengers between landings at different levels in buildings, for example. Moving walkways are usually used to carry passengers along levels extending horizontally or with only slight inclination.

An escalator or moving walkway typically includes a truss construction, balustrades with movable handrails, tread plates, a drive system and a step chain for engaging and propelling the tread plates. In an escalator the tread plates have the form of steps, while they have the form of pallets in case of a moving walkway. The step chain travels in an endless loop between turnaround sections located at an upstream landing and a downstream landing, respectively. The truss construction supports the other components of the conveyor and rests on a basement. The truss construction includes truss sections on lateral sides of the tread plates and extends in conveying direction. Each truss section has two end sections, the end sections on a respective longitudinal side forming landings, respectively. The end sections of a same lateral side are connected by an inclined or—in case of a moving walkway—possibly also horizontal midsection. One of the landings, e.g. in case of an escalator usually the upper landing, houses the drive system or machine of the passenger conveyor positioned between the trusses.

The drive system of an escalator or moving walkway typically comprises the step chain, a step chain drive sheave (e.g. in the form of a sprocket or toothed wheel), an axle and a drive motor. The step chain travels a continuous, closed loop, running from one landing to the other landing, and back. The tread plates are attached to the step chain through step chain axles. The step chain axles also support step chain rollers, which are guided by rails fixed to the truss construction, and thereby define the path of travel of the step chain and the tread plates. The drive motor drives the drive sheave which is, directly or via a further transmission, in a driving connection with the step chain.

In a common passenger conveyor the truss construction comprises a framework for supporting a plurality of rails which are arranged for guiding and supporting step rollers and step chain rollers which are mounted to the tread plates of the passenger conveyor and/or to the links of the step chain.

A section of such a conventional truss construction 1 is shown in FIG. 1. The conventional truss construction 1 comprises two pairs of longitudinal beams 21, 22. On each side of the conveyor one of the pairs extends in the longitudinal conveying direction of the conveyor. Each pair comprises a lower longitudinal beam 21 and an upper longitudinal beam 22 which is arranged above and parallel to the lower longitudinal beam 21. The lower longitudinal beam 21 and the upper longitudinal beam 22 of each pair are connected to each other by a plurality of generally vertical beams 14 and generally diagonal beams 24, forming a rigid framework on each lateral side of the conveyor in order to give the truss construction 1 the necessary rigidity and strength.

Cross plates 20 are mounted to at least some of the vertical beams 14. Crossbars 23 are fixed to the cross plates 20 connecting the two frameworks to each other.

A plurality of rails 18 for supporting step chain rollers and/or tread plates rollers are mounted to and supported by the cross plates 20. The guide rails 18 are fine machined from high strength steel, e.g. annealed steel or spring steel, to achieve satisfactory running characteristics of the rollers.

FIG. 1 shows only a section of the longitudinal beams 21, 22, the rails 18 and some of the diagonal beams 24, respectively, so that the longitudinal beams 21, 22, the rails 18 and some of the diagonal beams 24 appear to be cut off in FIG. 1. This, however, is caused only by the fact that FIG. 1 shows a section and not the entire length of the truss construction 1.

The individual beams 14, 21, 22, 24, cross plates 20 and rails 18 are made of steel and joined together by numerous welding connections to form a socalled truss. The cross plates 20 and rails 18 are fixed by adjustable holders and fixing parts to the truss.

The assembly and maintenance of such a conventional truss construction 1 is complex and expensive as it comprises a large number of different elements which have to be produced and mounted separately. The welding done in the factory requires knowledge and experience and involves complex apparatus to achieving the necessary exactness when mounting the guide rails, as the typical tolerances for the truss are some millimeters, while the typical tolerances for the guide rails are some tenths of a millimeter.

It is desirable to provide a truss construction for a conveying device which can be produced and mounted more easily with sufficient accuracy and with a minimum of adjustments needed.

SUMMARY

An exemplary embodiment of the invention provides a truss construction for a passenger conveyor comprising at least one self-supporting element extending in a conveying direction of the passenger conveyor, wherein the self-supporting element is formed with at least one rail portion for guiding step rollers or step chain rollers, and wherein the self-supporting element is a roller-molded element.

The invention further provides a method of modernizing a passenger conveyor, the passenger conveyor comprising at least one rail for supporting step chain rollers and/or step rollers of tread plates and a truss for supporting the rail, wherein the method comprises the steps of removing the rail from the truss and installing a truss construction according to an embodiment of the invention between the remaining parts of the truss.

The invention also provides a method of forming such a self-supporting element for a truss construction of a passenger conveyor, wherein the method includes the step of roller molding.

Exemplary embodiments of the invention are described in greater detail below with reference to the accompanying drawings.

DETAILED DESCRIPTION

Figure 1:
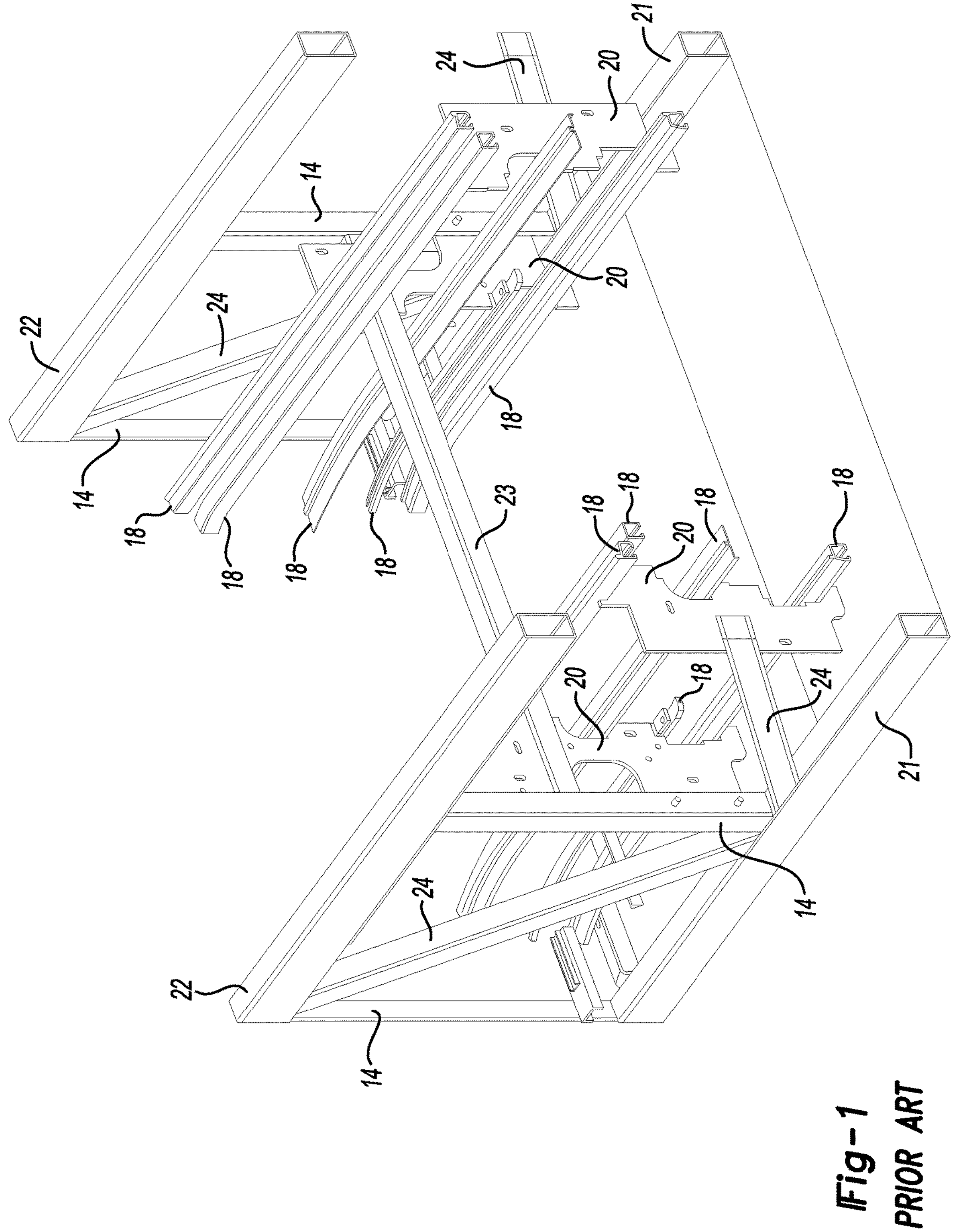
Fig-1 PRIOR ART
FIG. 1 shows a section of conventional truss construction in an perspective view.

In the following, the longitudinal direction of the conveyor is understood to specify the conveying direction, the lateral direction of the conveyor is understood to specify a direction essentially orthogonal to the conveying direction, and the vertical direction is understood to specify a direction essentially orthogonal to the plane spanned by the conveying direction and the lateral direction.

The truss construction 2 comprises an outer frame having vertical beams 14. The vertical beams 14 following one another in the longitudinal direction of the conveyor are arranged on both lateral sides of the conveyor. The outer frame has horizontal crossbars 23 extending in the lateral direction of the conveyor. Each crossbar 23 connects a pair of vertical beams 14, each of the vertical beams 14 of such a pair being arranged on a different lateral side of the conveyor.

The truss construction 2 comprises at least one pair of self-supporting elements 4, 16. The pair comprises an upper self-supporting element 4 and a lower self-supporting element 16. Each self-supporting element 4, 16 is mounted to respective vertical beams 14 on both sides of the conveyor, e.g. by welding.

In a particular installation there may be provided only one upper self supporting element 4 and only one lower self supporting element 16 on each lateral side of the conveyor. In other installations, a plurality of such upper self supporting elements 4 and lower self supporting elements 16 may be provided following one another in a longitudinal direction of the conveyor.

Each of the self-supporting elements 4, 16 extends in the longitudinal direction as well as in the vertical direction and is formed comprising three rail portions 6, 8, 9 for guiding rollers 7*a*, 7*b* attached to tread plates 26, 27, respectively.

Step chain rollers 7*a* are engaged by a step chain 5, one step chain 5 extending in a longitudinal direction on each lateral side of the conveyor.

Figure 2:
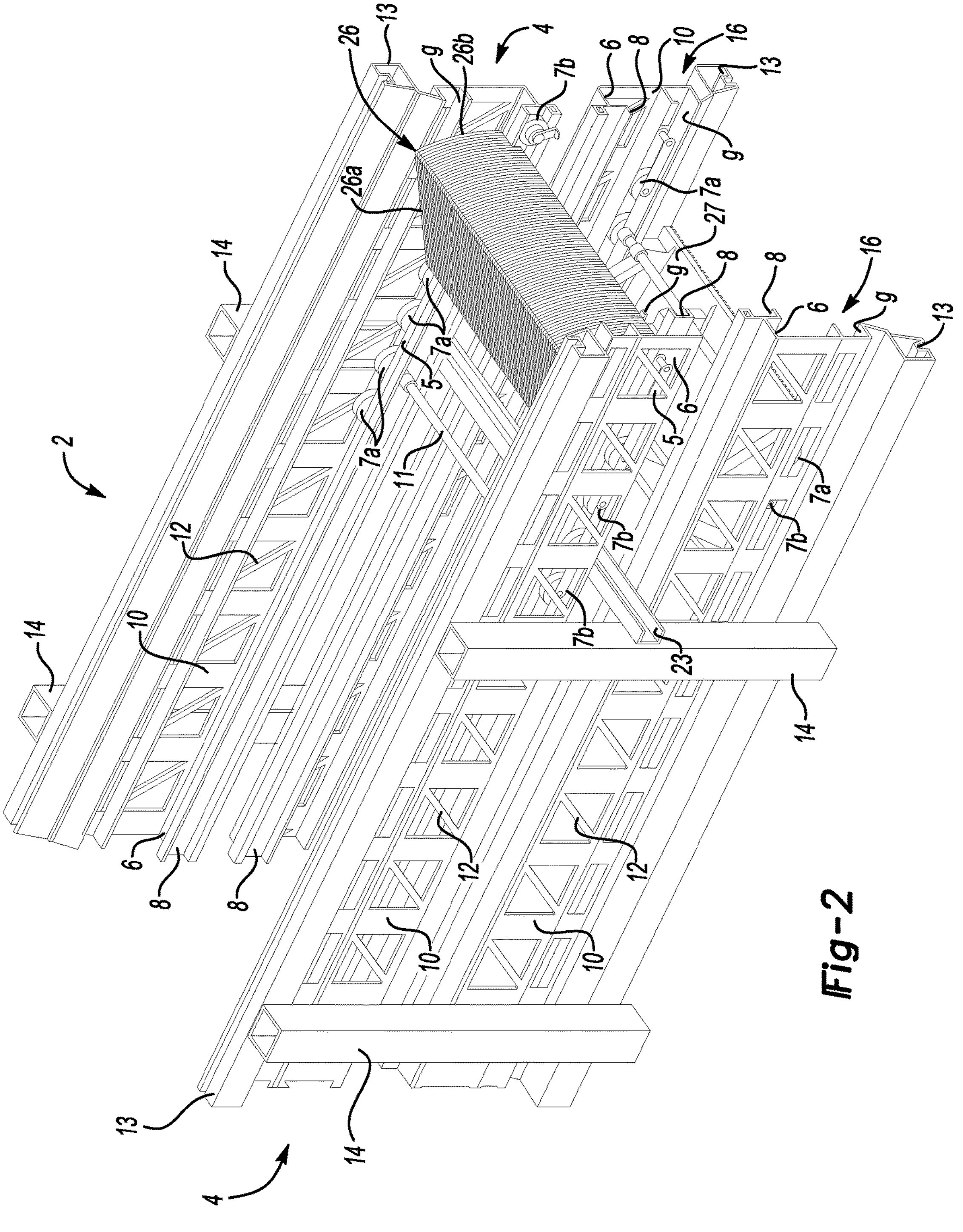
FIG. 2 shows a perspective view of a section of an embodiment of a truss construction according to the invention.

The four self-supporting elements 4, 16 shown in FIG. 2 are roller-molded elements, i.e. the self-supporting elements 4, 16, which have been formed by applying a roller molding process to an appropriate sheet of metal.

In the embodiment shown in FIG. 2 a pair of self supporting elements 4, 16 is mounted on each lateral side of the conveyor. The lower self supporting elements 16 are mounted upside-down with respect to the respective upper self supporting element 4, i.e. the two self supporting elements 4, 16 on each side of the conveyor are symmetrically mounted with respect to a plane of symmetry which is arranged midway in between the upper self supporting elements 4 and the lower self supporting elements 16 and which extends in the conveying direction of the conveyor. Typically the plane of symmetry will be a dividing plane, dividing an upper load section of the conveyor from a lower return section.

The self supporting elements 4, 16 of the second pair, which are arranged on the opposite lateral side of the conveyor, are similar or identical to the self supporting elements 4, 16 of the first pair and the self supporting elements 4, 16 of the second pair are arranged symmetrical to a vertical plane of symmetry which extends in the conveying direction of the conveyor and which is arranged midway between the first and the second pair of self supporting elements 4, 16.

Thus, the truss construction 2 comprises in the section shown in FIG. 2 four self supporting elements 4, 16, which are mounted in a different orientation with respect to each other.

Each of the self supporting elements 4, 16 comprises a plurality of roller molded structures including three rail portions 6, 8, 9 extending in the longitudinal direction guiding and supporting step chain rollers 7*a* and step rollers 7*b* of tread plates 26, 27. In particular, the step chain rollers 7*a*, which are engaged by a step chain 5, are guided by a first rail portion 6, while the step rollers 7*b* are guided by a second rail portion 8. Axles 11 connect pairs of step chain rollers 7*a*, each step chain roller 7*a* of a respective pair being arranged on a different lateral side of the conveyor.

Two exemplary tread plates 26, 27 are shown in FIG. 2. The rollers 7*a*, 7*b* of an upper tread plate 26, i.e. a tread plate traveling on the load section of the conveyor, are guided by the rail portions 6, 8 of the upper self supporting elements 4, respectively. The tread plate 26 comprises a tread section 26*a* and a riser section 26*b* and, when traveling in the load section, the tread plate 26 is aligned so that the tread section 26*a* is horizontal and a passenger using the conveyor can stand on tread section 26*a*.

The rail portions 8, 9 of the lower self supporting elements 16 form a return path for lower tread plates 27, i.e. tread plates traveling on the return section of the conveyor. The lower tread plates 27 are rotated with respect to the upper tread plates 26.

The self supporting elements 4, 16 also comprise a bar structure formed of vertical bars 10 and diagonal bars 12, the structure being formed by cutting out some material of the metal sheet used for forming the self supporting elements 4, 16 prior to or after the roller molding process.

Figure 3:
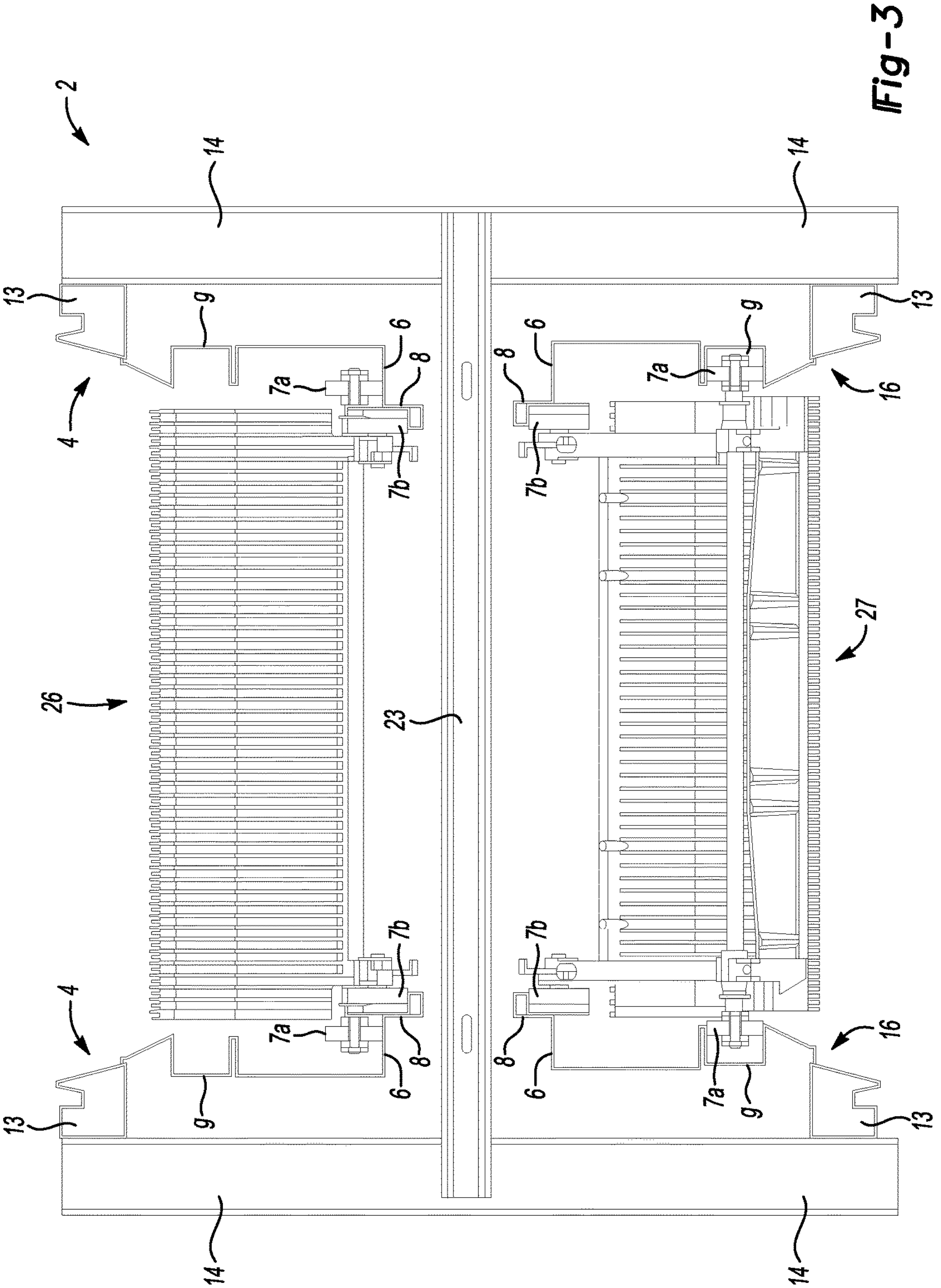
FIG. 3 shows a cross section of the embodiment shown in FIG. 2.

FIG. 3 shows a cross section of the truss construction 2 shown in FIG. 2 along a plane orthogonal to the conveying direction of the conveyor.

An outer frame is formed by the vertical beams 14 and the crossbar 23 connecting the two vertical beams 14. On each lateral side of the conveyor a respective upper self supporting element 4 is fixed to the vertical beams 14. The upper self supporting element extends in an area above the crossbar 23.

A pair of lower self supporting elements 16 is mounted to the vertical beams 14 in an area below the crossbar 23.

Each of the self supporting elements 4, 16 comprises a beam like roller molded structure 13 with a substantially closed cross section extending in the conveying direction of the conveyor for providing the necessary strength and rigidity of the respective self supporting element 4, 16.

Each of the self supporting elements 4, 16 also comprises two roller molded rail portions 6, 8 for conveying the rollers 7*a*, 7*b* of upper tread plates 26 traveling on the load section of the conveyor. Such tread plates 26 extend parallel to the crossbar 23 between the two upper self supporting elements 4.

For upper tread plates 26, the step chain rollers 7*a* are guided by respective first rail portions 6 of the upper self supporting elements 4, and the step rollers 7*b* are guided by second rail portions 8 of the upper self supporting elements 4. The orientation of the tread plates 26, 27 can be changed, i.e. the tread plates 26, 27 can be rotated around the axes of the two respective step rollers 7*b* by varying the vertical distance between the step chain rollers 7*a* and the step rollers 7*b*.

Besides the first and second rail portions 6, 8 a third rail portion 9 is formed within the self supporting elements 4, 16. This third rail portion 9 is not used, when the self supporting elements 4, 16 are used as upper self supporting elements 4 forming a load path of the conveyor.

The roller molded rail portions 6, 8, 9 shown in FIG. 3 have a rectangular profile. However, in alternative embodiments, the rail portions 6, 8, 9 may have any profile which is suitable for guiding the rollers 7*a*, 7*b* and which can be formed by roller molding.

In the embodiment shown in FIG. 2, the lower self supporting elements 16 are identical to the upper self supporting elements 4 but are mounted upside-down with respect thereto. In an alternative embodiment, which is not shown in the figures, the lower self-supporting elements 16 are different from the upper self supporting elements 4.

The second molded rail portions 8 and the third molded rail portions 9 form a return path for the tread plates 27 as the step chain rollers 7*a* are not guided by the first rail portions 6 by which they are guided on the load path formed in the upper part of FIG. 3, but by the third rail portions 9, which are arranged in a larger vertical distance from the second rail portions 8 as the first rail portions 6. The step rollers 7*b* continue to be guided by the second rail portion 8 on the return path.

As a result the vertical distance between the step chain rollers 7*a* and the step rollers 7*b* is increased and the tread plates 27, which are conveyed along the return path, are angled relative to the upper tread plates 26, which are conveyed along the load path.

The exemplary embodiment as described above with respect to FIGS. 2 and 3 provides a truss construction for a passenger conveyor which can be produced and mounted easily and at low costs, as it comprises only a small number of different elements which are easy to produce. The roller molded self supporting bearing elements 4, 16 combine the functionality of the rails, the cross plates and the vertical and diagonal beams of a conventional truss construction. Less space is needed for providing said construction combining the rails portions with the truss and less material is needed.

By applying roller molding technology it has been proven to be possible to produce in a single integral part, the rail portions of the self supporting elements with sufficiently high accuracy and beam portions of sufficient stiffness so that the self supporting elements have the necessary strength and rigidity to support the conveyor as a whole during use. Furthermore, according to the suggested structure, the rail portions contribute to the stability and rigidity of the self supporting elements.

One significant advantage of the truss construction according to the embodiment shown and described above is that it needs less space, and thus can be installed easily inside an existing escalator truss. An old conveyor can be modernized without dismantling the old truss completely. This facilitates and speeds up the modernization of old passenger conveyors, and considerably reduces the costs of this process.

The truss construction according to the embodiment shown above comprises at least one self supporting element which extends in a conveying direction of the passenger conveyor. The self supporting element is formed with at least one rail portion for guiding rollers of tread plates and/or a drive member like a step chain, and the self supporting element is in an exemplary embodiment a roller molded element. Such a self supporting element can be formed from a sheet-like metal work piece being subject to a roller molding process.

By using such a self supporting element the truss construction can be produced and mounted more easily and less material is needed. Producing the self supporting elements by roller molding facilitates the production of the self supporting elements, with high accuracy, and at low costs.

By forming one and the same sheet-like work piece with a plurality of roller molded structures, a self supporting element can be created, which at the same time provides the necessary strength and rigidity of the truss construction and the necessary accuracy of the rail portions. These advantages can be achieved without significant increase in cost, in large part due to easier installation of the truss construction.

In an embodiment the self supporting element includes at least one roller molded rail portion extending in a conveying direction of the passenger conveyor. A roller molded rail portion can be produced easily and at low costs with the high accuracy needed to ensure as smooth rolling of the rollers in order to meet the desired ride quality standards.

In an exemplary embodiment cut outs are formed in the self supporting element. In particular, vertical bar portions extending in a direction perpendicular to the conveying direction and diagonal bar portions are formed by cutting out some of the sheet material. Removing material from the self supporting element reduces its weight. Furthermore, the material cut out may be recovered for further use.

In an exemplary embodiment the self supporting element includes at least one roller molded beam structure extending in a conveying direction of the passenger conveyor. Such a roller molded beam portion enhances the stability and rigidity of the self supporting element.

In a further embodiment the roller molded beam structure has a substantially closed cross section. Such a beam portion can be produced by roller molding easily and at low costs and provides the self-supporting element with the necessary strength and rigidity.

In a further embodiment the truss construction comprises a plurality of vertical beams for supporting the at least one self supporting element. The self supporting element may be fixed to at least some of the external beams for support. By fixing the self supporting element to vertical beams the self supporting element can be supported easily on a basement. Only a limited number of joints have to be provided, e.g. by welding, bolting or screwing, when installing the self supporting elements in a truss construction.

In an exemplary embodiment the passenger conveyor is an escalator and the truss construction comprises an inclined portion of the escalator. In further embodiment the truss construction also comprises a transition area and/or landing area of the passenger conveyor. When the truss construction comprises an inclined portion, a transition area and/or a landing area, the conveyor can be produced and mounted easily as the inclined portion, the transition area and/or the landing area are integrally formed by a very small number of different elements. This reduces the time needed as well as the costs for producing and installing the conveyor or escalator.

A maximum of cost efficiency can be achieved in case the truss construction is applied to a conveyor as a whole. In case of an escalator, e.g. the truss construction as suggested above comprises landing areas, at least one inclined area and transition areas.

In a further embodiment the truss construction may comprise a first pair of identical self supporting elements. The first pair of identical self supporting elements may be disposed in a load path of the conveyor. Using a pair of identical self supporting elements reduces the costs, as only a single roller molding process needs to be implemented for producing the self supporting elements.

In a further embodiment the truss construction may comprise a second pair of self supporting elements. The second pair of self supporting elements may be disposed below the first pair of self supporting elements forming a return path for the tread plates. By using a second pair of self supporting elements the return path for the tread plates can be set up conveniently and easily at low costs.

In a further embodiment the second pair of self supporting elements may be arranged symmetrically to the first pair of self supporting elements with respect to a plane which is arranged parallel to the conveying direction of the conveyor and which divides the load path from the return path.

In a further embodiment the self supporting elements of the second pair may be identical to the self supporting elements of the first pair. Thus, the same form of self supporting elements can be used for the load path of the conveyor as well as for the return path. This reduces the costs for producing the self supporting elements, as only a single roller molding process needs to be implemented for producing the self supporting elements.

The invention also comprises a passenger conveyor comprising at least one self supporting element which is a roller molded element and which extends in a conveying direction of the passenger conveyor and which is formed with at least one rail portion for guiding rollers associated with tread plates and/or a step chain. Such a passenger conveyor can be produced and mounted easily, fast and at low costs, as it comprises only a small number elements which have to be produced and mounted.

The invention also comprises a method of modernizing an existing passenger conveyor, wherein the existing passenger conveyor comprises rails for supporting step chain rollers or step rollers of tread plates, and a truss supporting the rails. The method of modernizing comprises the step of removing the rails of the old escalator and the step of installing, between the remaining parts of the truss, a truss construction comprising self supporting elements which are formed with at least one rail portion for a guiding step chain rollers and/or step rollers of the tread plates and which are roller molded elements.

By such a method of modernizing an existing conveyor can be modernized easily and at low costs, as it is not necessary to remove the old truss construction completely. Instead, parts of the old truss construction can be used for supporting new parts, in particular, the new truss construction. This also saves time when modernizing an old conveyor.

In an embodiment of the method of modernizing a conveyor, the step of removing parts of the truss may include removing horizontal and diagonal beams of the truss, but does not include removing vertical beams of the truss. In this embodiment the conveyor can be modernized conveniently, as the vertical beams, which are usually firmly fixed to the basement, need not to be dismantled but can be used for supporting the new conveyor truss.

The invention also comprises a method of forming self supporting elements comprising at least one rail portion for guiding rollers of a step chain and/or tread plates including the step of roller molding. In particular, the invention comprises a method of forming such a self supporting element wherein the self supporting element is formed by a single roller molding process. By using a roller molding process, and in particular by using a single roller molding process, the self supporting elements can be produced easily, fast and at low costs with high accuracy.

While the invention has been described with reference to exemplary embodiments, it will be understood by those skilled in the art that various changes may be made and equivalents may be substituted for elements thereof without departing from the scope of the invention. In addition, many modifications may be made to adapt the particular situation or material to the teachings of the invention without departing from the essential scope thereof. Therefore it is intended that the invention not be limited to the particular embodiments disclosed, but that the invention will include all embodiments falling within the scope of the appended claims.

The invention claimed is:

1. Truss construction for a passenger conveyor, comprising at least one self-supporting element extending in a conveying direction of the passenger conveyor, wherein the self-supporting element is formed with at least one rail portion for guiding step chain rollers or step rollers, and wherein the self-supporting element is a roller molded element.

2. Truss construction for a passenger conveyor as claimed in claim 1, wherein the self-supporting element comprises a plurality of molded structures.

3. Truss construction for a passenger conveyor as claimed in claim 1, wherein the self-supporting element includes at least one molded rail portion extending in a conveying direction of the passenger conveyor.

4. Truss construction for a passenger conveyor as claimed in claim 1, wherein at least a portion of the self-supporting element has cut-outs formed therein.

5. Truss construction for a passenger conveyor of one as claimed in claim 1, wherein the self-supporting element includes at least one roller molded beam structure extending in a conveying direction of the passenger conveyor.

6. Truss construction for a passenger conveyor as claimed in claim 5, wherein the roller molded beam structure has a substantially closed cross section.

7. Truss construction for a passenger conveyor as claimed in claim 1, comprising a plurality of vertical beams for supporting the at least one self-supporting element.

8. Truss construction for a passenger conveyor as claimed in claim 7, wherein the at least one self-supporting element is fixed to at least some of the vertical beams.

9. Truss construction for a passenger conveyor as claimed in claim 1, wherein the passenger conveyor comprises an inclined portion and the truss construction comprises the inclined portion of the passenger conveyor.

10. Truss construction for a passenger conveyor as claimed in claim 1, wherein the passenger conveyor comprises at least one of a transition area and a landing area and the truss construction comprises at least one of the transition area and the landing area of the passenger conveyor.

11. Truss construction for a passenger conveyor as claimed in claim 1, comprising a first pair of identical self-supporting elements, which are arranged at lateral sides of the passenger conveyor, symmetrically to a first plane extending vertically and parallel to the conveying direction of the conveyor.

12. Truss construction for a passenger conveyor as claimed in claim 11, wherein a second pair of self-supporting elements is disposed below the first pair of self-supporting elements.

13. Truss construction for a passenger conveyor as claimed in claim 12, wherein the second pair of self-supporting elements is arranged symmetrically to the first pair of self-supporting elements with respect to a second plane extending parallel to the conveying direction of the conveyor, the second plane being orthogonal to the first plane.

14. Truss construction for a passenger conveyor as claimed in claim 12, wherein the self-supporting elements of the second pair are identical to the self-supporting elements of the first pair.

15. The truss construction for a passenger conveyor of claim 1, wherein the at least one rail portion of the self-supporting element extends in a generally horizontal direction from a vertically oriented portion of the self-supporting element and the at least one rail portion does not contact other structural members of the truss.

16. A passenger conveyor comprising a truss construction including at least one self-supporting element extending in a conveying direction of the passenger conveyor, wherein the self-supporting element is formed with at least one rail portion for guiding step chain rollers or step rollers, and wherein the self-supporting element is a roller molded element.

17. The passenger conveyor of claim 16, wherein the at least one rail portion of the self-supporting element extends in a generally horizontal direction from a vertically oriented portion of the self-supporting element and the at least one rail portion does not contact other structural members of the truss.

18. Method of modernizing a passenger conveyor, the passenger conveyor comprising:

at least one rail for supporting step chain rollers or step rollers of tread plates, and a truss supporting the at least one rail;

wherein the method comprises the steps of:

removing the at least one rail from the truss, and installing a truss construction between remaining parts of the truss, the truss construction including at least one self-supporting element extending in a conveying direction of the passenger conveyor, wherein the self-supporting element is formed with at least one rail portion for guiding step chain rollers or step rollers, and wherein the self-supporting element is a roller molded element.

19. Method of modernizing a passenger conveyor as claimed in claim 18, wherein the step of removing includes removing horizontal and diagonal beams from the truss.

20. Method of modernizing a passenger conveyor as claimed in claim 18, wherein the step of removing does not include removing vertical beams from the truss.

21. The method of claim 18, wherein the at least one rail portion of the self-supporting element extends in a generally horizontal direction from a vertically oriented portion of the self-supporting element and the at least one rail portion does not contact other structural members of the truss.

22. A method of forming a self-supporting element of a truss construction for a passenger conveyor including the step of roller molding, wherein the truss construction includes at least one self-supporting element extending in a conveying direction of the passenger conveyor, wherein the self-supporting element is formed with at least one rail portion for guiding step chain rollers or step rollers, and wherein the self-supporting element is a roller molded element.

23. Method of forming a self-supporting element as claimed in claim 22, wherein the self-supporting element is formed in a single roller molding process.

* * * * *